Jan. 24, 1950     H. J. HERSEY, JR     2,495,635
DUST FILTER
Original Filed Feb. 9, 1944     3 Sheets-Sheet 1
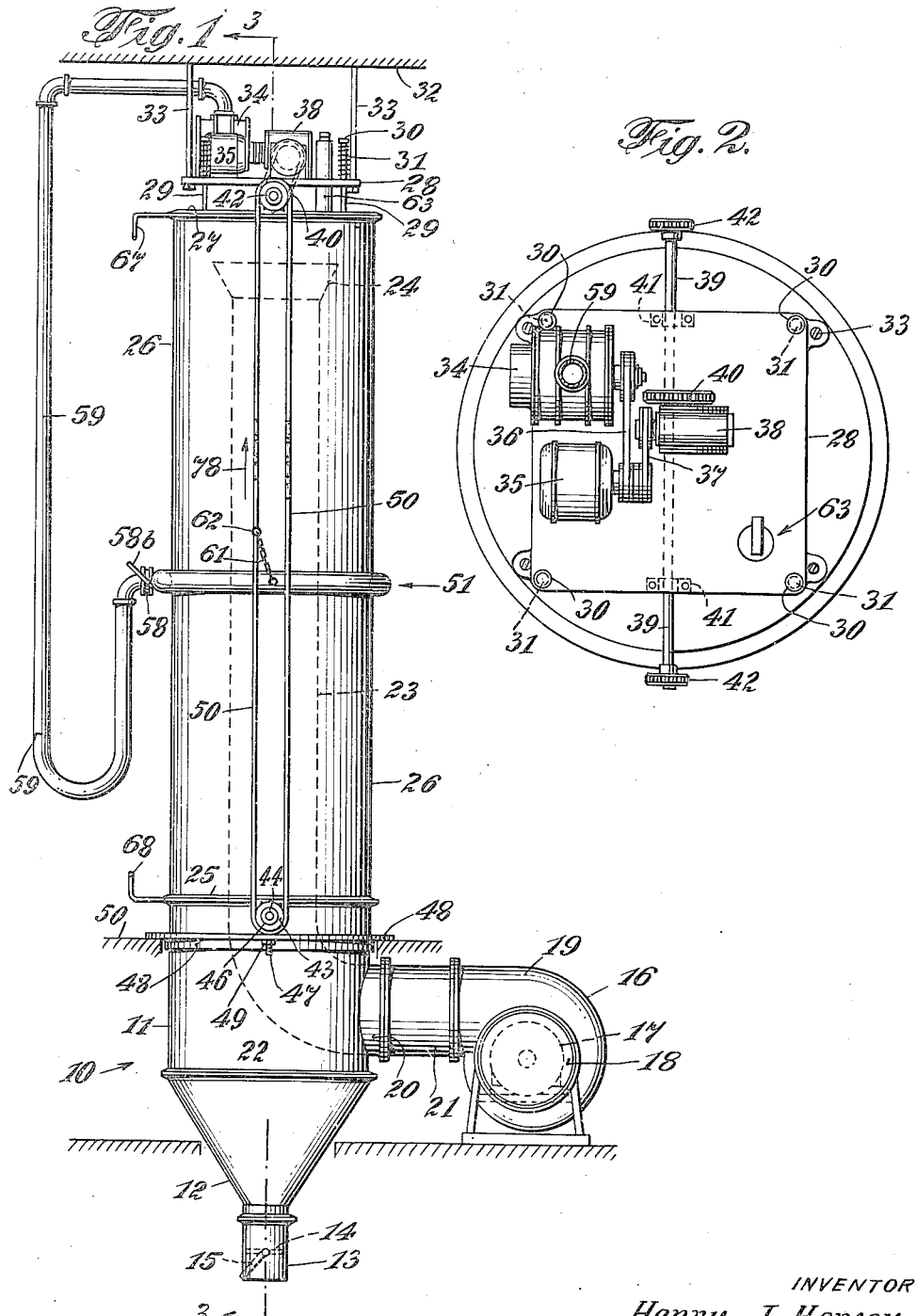
INVENTOR
*Henry J. Hersey Jr.*
By *Ridsdale Ellis*
his ATTORNEY Jan. 24, 1950     H. J. HERSEY, JR     2,495,635
DUST FILTER
Original Filed Feb. 9, 1944     3 Sheets—Sheet 2
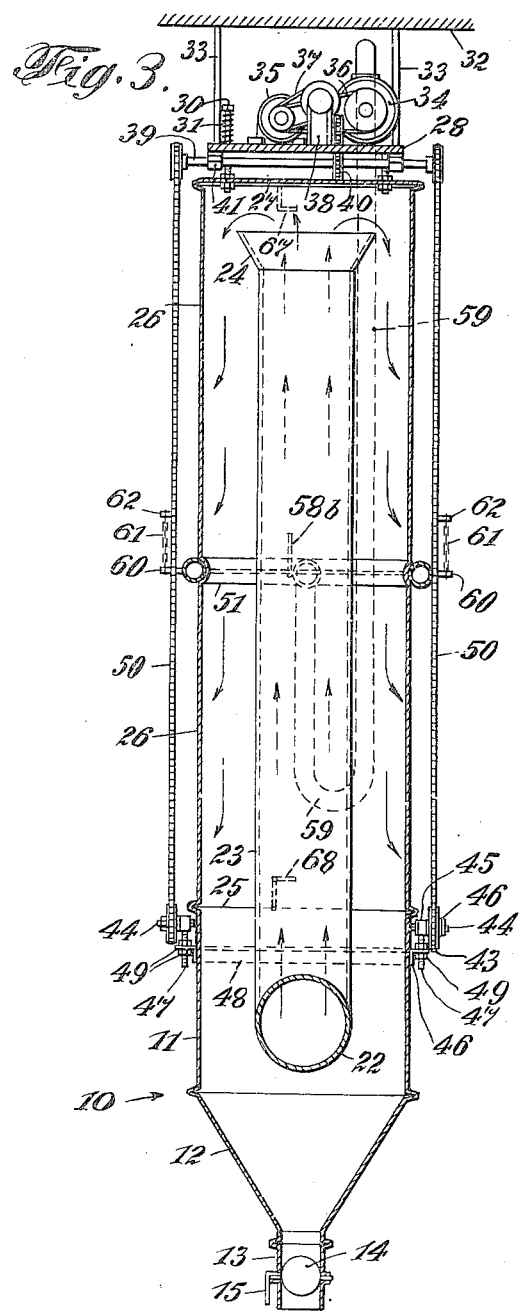
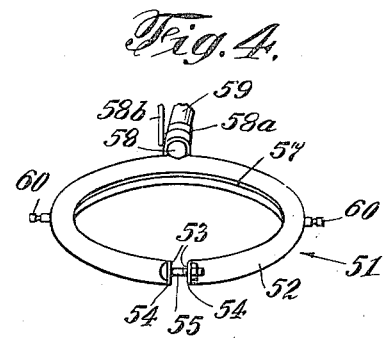
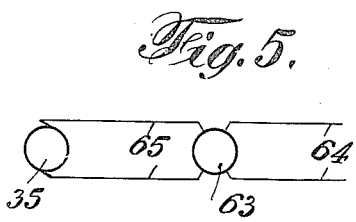
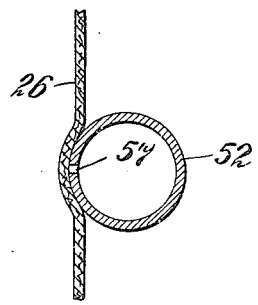
INVENTOR
Henry J. Hersey Jr.
By Ridsdale Ellis
his ATTORNEY Jan. 24, 1950  H. J. HERSEY, JR  2,495,635
DUST FILTER
Original Filed Feb. 9, 1944  3 Sheets-Sheet 3

INVENTOR
Henry J. Hersey Jr.
By Ridsdale Ellis
his ATTORNEY

Patented Jan. 24, 1950

2,495,635

UNITED STATES PATENT OFFICE 2,495,635

DUST FILTER

Henry J. Hersey, Jr., Chatham, N. J.

Continuation of application Serial No. 521,695, February 9, 1944. This application July 12, 1946, Serial No. 683,018

3 Claims. (Cl. 183—61)

This invention relates to a method and apparatus for filtering dust-laden gases of the type in which the filter medium is cleaned without interrupting the filtering operation by a jet of relatively high-pressure gas blown through the filter medium in the reverse direction to the flow of gas being filtered.

This application is a continuation of my application Serial Number 521,695, filed February 9, 1944, now abandoned.

More particularly the invention relates to the filtering of air or other gases containing particles of very small size.

For the filtering of fine dusts ordinary woven fabric is not satisfactory. Unless the threads are so fine that the fabric is too delicate for extended commercial use, the interstices are too large to block the passage of the smaller particles. To give the desired mechanical strength coupled with high filtering power as regards the maximum size particle which can pass, it is necessary to use a fabric having interstices much smaller than its thickness. Felt has such characteristics.

Felt has been proposed for use as a filter medium and has been found to be highly efficient when first used. The trouble has been that the pores of the felt soon clog up so that the amount of air passing falls off to a point at which the capacity of the filter is so low as to be impracticable.

It has been proposed to clean screens and filters of woven fabric by projecting a stream of air from a slotted tube against the surface opposite to that on which the dust collects to remove the dust particles caught in the meshes of the fabric. However, this reverse flow jet cleaning system does not appear to have been applied to close dense thick filter elements of the felt type.

I have found that certain conditions should be observed to obtain good results by this reverse-flow jet cleaning method as applied to filter mediums of the felt type.

With woven fabric it is often sufficient to direct the jet of cleaning air towards the outer surface of the fabric, the inertia of the cleaning air being sufficient to carry it through the fabric pores. In other words it is not necessary with such material, to have the mouth of the cleaning air jet in contact with the fabric.

However, with a filter medium having interstices much smaller than its thickness, such as felt, the resistance to the flow of air is so great that the inertia of the cleaning air is not sufficient to carry it through the filter medium. The tendency is for the air to escape laterally instead of passing through the filter.

This means first, that the filter medium must be flexible or the jet must be resiliently mounted so that as the jet moves to and from over the filter surface the two can remain in contact.

Second, as the pressure of the cleaning air tends to push the filter surface away from it there must be a force provided acting in opposition to and greater than the force produced by the cleaning air.

When these two conditions are complied with the lateral escape of cleaning air is largely if not entirely prevented so that substantially all of the latter is compelled to flow through the felt.

The precise mode by which a filter medium of the felt type retains the particles suspended in air is uncertain. This uncertainty is due largely to the fact that particles much smaller than the passageways through the felt are retained. Conseqeuently, there seems to be more than a true screening-out action, such as exists in the case of a woven-wire screen. Apparently as the particles pass through the tortuous passages they are thrown against and adhere to the passage walls. Further particles contact these adhering particles and the process is frequently continued until the passageways are bridged-over. This action is probably confined chiefly to the layers of the felt medium next to the high-pressure side of the filter.

Simultaneously with and after the deposition of particles in the surface layers of the felt, there is also a building up of a dust layer on top of the felt surface. This dust layer, if undisturbed, increases in thickness and density to the point at which the filter ceases to act efficiently.

The cleaning air, therefore, does two things. First, it keeps open a sufficient number of the passageways through the felt to maintain the desired porosity. Second, it breaks off the dust layer on top of the felt or at least opens enough channels therethrough to permit air to flow into the felt beneath.

The cleaning of the filter medium by reversing the direction of flow of air therethrough involves moving these adhering particles and masses of particles in the opposite direction to which they entered the interstices. Mere reversal of air flow does not insure that each particle is carried back along the same passageway by which it entered until it finally leaves the filter medium. Particles become wedged in between the fibers or enter pockets through which the cleaning air might not flow or through which it might flow with sufficient velocity to dislodge them.

Two other conditions are, therefore, required for sufficient cleaning of the filter. First, the velocity of the cleaning air through the filter should be greater than the velocity of the air being filtered. In that way a dislodging force is obtained which is greater than the force which caused the particles to be retained in the interstices of the filter during filtering.

Secondly, that portion of filter medium in register with the cleaning jet should be stretched on the side on which the air to be filtered enters and on which the cleaning air leaves the filter medium. This stretching elongates the interstices in the direction in which the stretching force is exerted. This elongation is probably accompanied by a contraction of the interstices in a direction perpendicular to that in which the elongation occurs. Whether the contraction is greater or less than the elongation does not appear to affect the cleaning. In either event, there is a distortion of the passageways which tends to break up any particle "bridges" which formed during the filtering part of the cycle and makes easier the removal of their component particles. Further, any relative movement of the fibers composing the filter medium helps to dislodge any particle wedged in between two or more fibers.

Examination of sections of felt which have been in use for several months shows that practically all the dust is caught in the first half of the felt layer. Consequently it is sufficient for cleaning purposes to stretch the inside half only. The outer half may be compressed somewhat without affecting the liberation of trapped particles.

If, therefore, the felt while under tension as a whole is bent around a slotted pipe supplied with the cleaning air, that part of the felt in contact with the pipe will be under compression while the other parts will be under tension.

These various conditions may be most readily complied with by using as the filtering medium a felt cylinder into the upper part of which the dust-laden air is introduced while the separated dust is collected and drawn off from the bottom. Surrounding the felt cylinder is a tubular ring supplied with relatively high pressure air from an air compressor. This ring as a whole has an internal diameter somewhat less than the external diameter of the cylinder when the latter is distended by the pressure of the air to be filtered. Around the inner periphery of this ring is a slot for the discharge of the cleaning air.

As the ring is smaller than the felt cylinder the latter curves around the inner part of the ring, and, due to the pressure inside the cylinder, the inner part of the felt at this point is under tension and its interstices are thereby expanded. The mutual action of the ring and cylinder as well as the relationship between the forces set up by the pressure of the air to be filtered and the pressure of the cleaning air will be set forth in detail in connection with the description of the specific form of construction shown in the drawings.

The reverse flow cleaning jet merely removes the dust particles from the interstices in the filter and from the inner wall of the bag and projects them back into the interior of the latter from whence they came. The cleaning air so introduced then has to flow outwards through the filter along with the air to be filtered. Unavoidably some of the dust removed from the filter is re-deposited in and on the filter. To get efficient operation the percentage re-deposited should be as small as possible and further its point of re-deposit should be as far below the point of initial deposit as practicable.

No progress would be made if all the dust removed by the cleaning jet came back onto the same or a higher section of the filter medium. A large part of the dust so removed must either drop by gravity or be carried by air currents to the collecting space at the bottom of the filter chamber or be re-deposited on a lower section of the filter medium.

It appears that to reduce the percentage of re-deposit as far as possible, the dust removed should be carried to the central part of the air space inside the filter bag where some of it can coagulate and drop by gravity. Further, as the dust is some distance from the filter wall its re-deposit in part at least is delayed. If the dust removed is almost immediately carried back onto and into the filter little progress will be made.

These conclusions are supported by actual observations of the change in pressure inside the filter bag as the cleaning ring reciprocates up and down. Especially with tall filter bags there is a markedly greater drop in pressure inside the bag on the down stroke of the cleaning ring than on the upstroke. The actual cleaning action must be approximately the same on both strokes so that the difference in pressure drops would appear to be due to a difference in the rate at which the clean sections become clogged again.

The general flow of air is from the top down. Hence, if the clean section of the bag is above the cleaning ring as it is when the ring is moving downwards, the rush of air to the clean section will not go past the section being cleaned. That means that such rush of air does not prevent the cleaning air carrying the dust it has removed to the central portions of the filter bag. If, on the other hand, the clean section of the bag is below the cleaning ring (as it is when the ring is moving upwards), the downward rush of air to the clean section will sweep by the section being cleaned and carry with it the dislodged dust and sweep it back into and onto the filter.

As the volume of cleaning air should be kept as low as possible, the cleaning air should be used only when it can do the most good. Consequently, for best results cleaning air should be supplied to the ring on the downstroke only.

Where the ring is reciprocated rapidly so that there is little difference in cleanliness of one section of the filter over another, this precaution is of much less importance.

The apparatus in the preferred form for carrying out the method is shown in the accompanying drawings, in which:

Figure 1 is a view in elevation of the improved dust filter;

Figure 2 is a plan of the same;

Figure 3 is a vertical section on the line 3—3 of Figure 1;

Figure 4 is a perspective view of the cleaning ring;

Figure 5 is a diagrammatic view showing switch control;

Figure 6 is a sectional detail showing the relation of the cleaning ring and filter bag;

Figure 7:
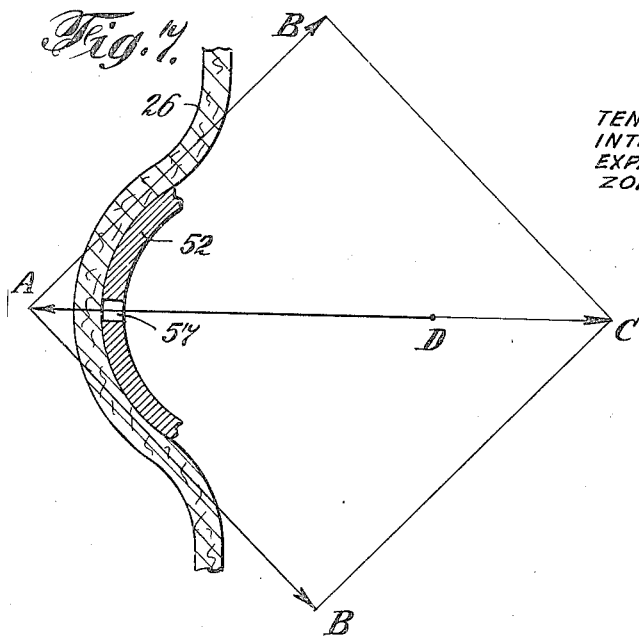
Figure 7 is a sectional detail illustrating the relationship between the tension and the compression zone.

The invention, in a preferred illustrative form, includes a hopper 10, having a cylindrical wall 11, a conical collector 12, and a discharge chute 13 provided with a cut-off 14, manually operable through a handle 15.

A relatively low pressure blower 16, driven by a motor 17, has an air intake 18 for the dust-laden air, and an outlet 19 connected to the lower terminal of air pipe 23, the end of the pipe extending through the hopper wall 11 connected to the outlet 19 by a removable pipe section 21. A platform 28 is suspended from a suitable fixture 32 by hangers 33, and in turn supports the top closure 27 of a filter bag 26. The lower end of the filter bag is connected to the upper end of the cylindrical wall 11 of the hopper, and such filter is disposed in concentric spaced relation with the air pipe 23. The upper end of the air pipe 23 terminates below the upper end of the filter bag 26 as an open preferably flaring end 24, so that the dust-laden air delivered by the blower will be directed through pipe 23, and delivered to the filter bag near the upper end of the latter and forced downwardly under blower pressure toward the hopper. The air cleared of impurities will pass through the filter bag and the dust particles separated therefrom will fall by gravity and under blower pressure into the hopper.

The filter bag is kept clean by a hollow annular cleaning ring 51, Figure 4, of split form with terminal ears 54 connected together by a bolt or the like 55. The cleaning ring 51 is formed with a narrow slit 57 through its inner peripheral margin and has an air inlet connection in the form of a nipple 58, having a valve 58a controlled by a lever 58b.

The cleaning ring is designed to be in contact with the outer surface of the filter bag 26, when the latter is distended, the internal diameter of the ring being reduced by tightening the connector 55 until it is somewhat less than the external diameter of the distended filter bag 26. The ring will thus act to press the filter bag slightly inward throughout an area commensurate with the thickness of the ring, and of which area the narrow slot 57 forms the substantial center. The space between the terminal ears allows the bag to expand at that point and thereby compensate for the contraction of the bag by the ring over the remainder of the circumference of the bag. The high pressure air admitted will be discharged through the filter bag, its escape in any other direction being prevented by the contact of the ring and bag.

Supported on the platform 28 is an air compressor 34, driven by a motor 35 by belt 36, the motor also driving a transverse shaft 39, mounted below the platform and having a length exceeding that of the diameter of the filter bag 26. The driving connections between the motor 35 and the shaft 39 includes a speed reduction unit 38, driven through belt 37 by motor 35 and gears 40. The outlet of the air compressor 34 is connected by a flexible hose 59 with the air inlet nipple 58 of the cleaning ring 51. Air is thus continuously directed through the slot 57 of the ring 51 and through that portion of the filter bag 26 with which the slot may be in register so long as the compressor is operating.

Provision is made for reciprocating the cleaning ring 51 vertically to and from throughout substantially the entire length of the filter bag 26. In providing for this movement of the cleaning ring the ends of shaft 39 on the platform are provided with sprocket wheels 42 connected by chains 50 to corresponding sprocket wheels 43, mounted on stub shafts 44, carried by bearings 45, the wheels 43 being retained on the shafts 44 by collars 46. The bearings 45 are adjustably supported by a ring 48 by threaded rods 47. By turning the rods 47 the vertical position of the lower sprockets 43 can be varied as desired.

The sprockets 42 and 43 are thus arranged in aligned pairs in diametrically-opposed relation with and beyond the filter bag 26, as clearly shown in Figure 3. A connector, preferably a chain length 61, attached to each chain by a pin 62 and further connected to appropriate diametric pins 60 extending outwardly from the cleaning ring 51. The chain lengths 61 are longer than the diameter of the sprockets 42 so that when the pins 62 pass over the tops of the sprockets the pins 60 are below the bottoms of the sprockets 42. Consequently the ring 51 is raised to a position slightly below the sprockets 42 and then lowered after the pins 62 start their downward movement. The friction of the ring 51 on the distended felt cylinder is sufficient to support the ring against the force of gravity. Hence the downward movement of the ring does not commence until the chain lengths have been stretched out downwardly to pull the ring down. Consequently the ring will not move down so far that its pins 60 interfere with the lower sprockets 43.

For reasons stated above it is desirable that the cleaning ring exerts its cleaning function only on its downward movement as then the cleaned surface of the bag is above the cleaning ring. To accomplish this means must be provided to admit air under pressure to the cleaning ring in its downward movement and prevent such air admission during upward travel of the ring.

To provide for this control of the air admission to the cleaning ring, a trip 67 is provided at the upper end of the filter bag 26 in position to be engaged by the valve controlled lever 58b of the air inlet to the cleaning ring, and in this engagement operate the lever to open the valve and admit air under pressure from the blower 34 to the ring. At its lower limit of movement, the cleaning ring valve controlled lever 58b engages a lower trip 68 in line with the upper end of the cylindrical body 11 of the hopper 10. In this engagement, the valve 58 of the cleaning ring is closed, so that during the upward movement of the ring, no air is admitted thereto, and no cleaning of the filter bag occurs.

As all the cleaning air has to pass outwardly through the filter it is desirable, not only that the use of such air be restricted to the down stroke of the cleaning ring but also to such periods as the filter requires cleaning. For this purpose the operation of the motor 35 is controlled by the pressure within the bag. When the pressure exceeds a predetermined figure the motor starts. When it falls below a predetermined figure the motor stops. Any conventional or desired type of pressure switch may be used so that description of such a switch is unnecessary and it is indicated symbolically only on the drawings at 63.

Thus, the cleaning ring is brought into operation only when the filter bag reaches a predetermined constructed condition, and functions as a cleaning agent only on its down stroke over the filter bag.

In operation, the air or other medium to be filtered is fed by the blower 16 to and through the tube 23 and delivered under pressure to the interior of the filter bag near the top. The material received by the filter bag is in the most part delivered under pressure to the hopper 10, but the finer particles collect in the surface of the filter bag and tend to reduce the filtering efficiency. This tends to retard the free flow of the air through the filter, and when a predetermined pressure condition is built up, the switch 63 is closed, the motor 35 energized, and the chains 50 operated to reciprocate the cleaning ring 51. As the ring moves down the exterior surface of the filter bag, air under pressure is delivered by the ring to and through the filter, clearing the inner surface of the fine embedded particles. When the ring reaches the lower end of the filter bag, the air flow therethrough is cut off by the trip 68, and on the upward movement of the ring, no air is forced through the filter bag. At the limit of the upstroke, the trip 67 opens the valve 58 of the ring, and the air under pressure is admitted to the ring for clearing the filter bag.

One of the most important features of the invention is the operative relationship between the cleaning ring and filter bag. As shown in Figure 6, it will be noted that as the internal diameter of the ring is less than the external diameter of the bag when distended, the ring produces a concavo-convex portion in the bag where the ring is in contact therewith.

This has two important results. First, the internal pressure on the bag produces forces along the lines AB—AB which pull the bag outwardly against the inner periphery of the cleaning ring. The resultant of these forces is indicated by AC. The cleaning air produces a force which is represented as AD. So long as AC exceeds AD there will be no lateral leakage of cleaning air.

Figure 8:
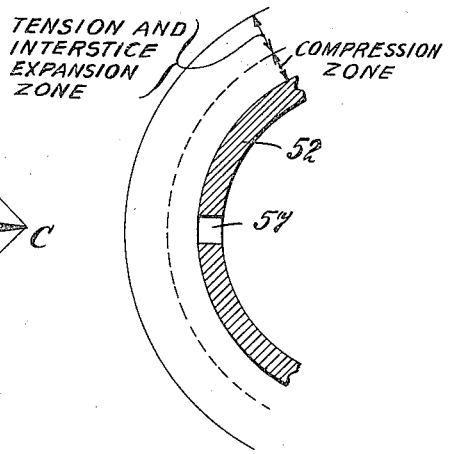
Figure 8 is a similar view illustrating the approximate relationship between the forces operating on the filter fabric adjacent the cleaning jet.

Secondly, the bending of the filter bag into concavo-convex form tends to open up the interstices on the inner wall of the filter. Examination of felt filters which have been in use for several months showed that practically none of the dust penetrated more than halfway through the felt. As shown diagrammatically in Figure 8, the felt has two zones, a tension and interstice expansion zone and a compression zone. The exact location of the line dividing the two zones is not important especially as in all probability due to the forces AB—AB, the interstice expansion zone extends further into the felt than any appreciable quantity of dust has entered.

As previously explained, this spreading or opening of the bag throughout this area on the inner side tends to more easily dislodge the finer particles and to make more effective the blast from the cleaning ring. In this connection, it will be noted that the outer side of the filter bag is not similarly spread and hence the normal interstices of the fiber of the bag remain in their normal condition.

Figure 9:
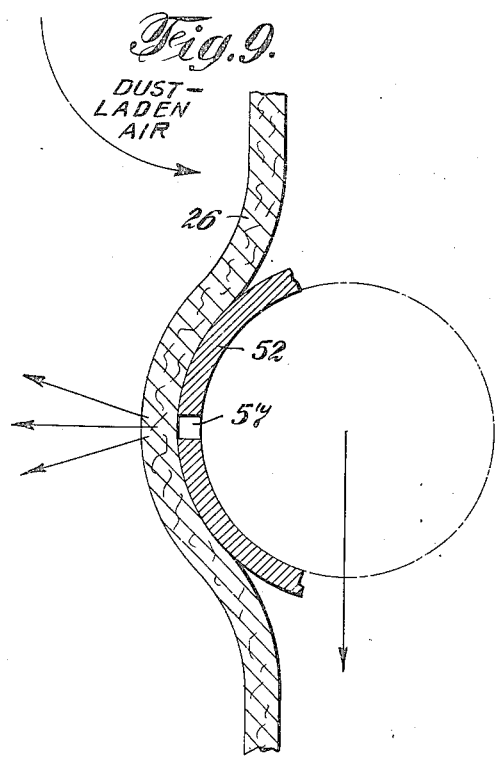
Figure 9 is a sectional detail illustrating the action of the cleaning ring and cleaning air on the downstroke of the ring.
Figure 10:
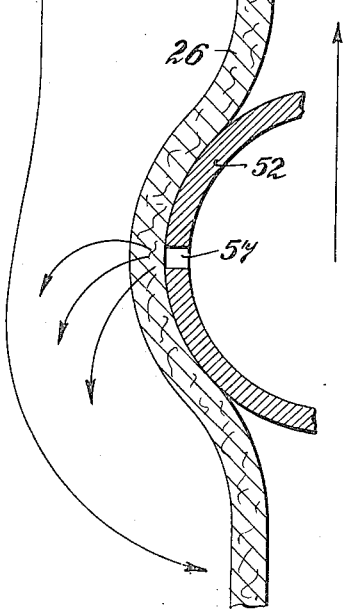
Figure 10 is a similar view for the upstroke of the ring.

Figures 9 and 10 indicate diagrammatically the difference in the flow of air inside the filter when the cleaning ring is moving downwardly compared with the flow of air when it is moving upwardly.

What I claim is:

1. A dust filter comprising a cylindrical filter element having its axis vertically disposed and formed of a flexible sheet material having interstices much smaller than its thickness, means for supplying dust laden gases to the upper interior portion of said element at a pressure greater than that on the outer surface thereof, a horizontally disposed tubular member pressed inwardly against the outer surface of said element to cause the latter to bend around said member under the pressure of the dust laden gases and thereby elongate the interstices of said element on the inner side thereof, said tubular member having a slot therein through its side contacting said element, means for applying relatively high pressure gas to said tubular member for discharge through said slot, means for moving said tubular member to and fro vertically whereby to traverse the outer side of said element, and means for interrupting the supply of high pressure gas to said tubular member during the up-stroke of said tubular member.

2. A dust filter as in claim 1 which also includes means controlling said moving means and high pressure gas supplying means for interrupting the movement of said tubular member and the supplying of high pressure gas thereto whenever the pressure drop through the filter element falls below a predetermined degree, and resuming the movement of said tubular member and the supply of high pressure gas thereto whenever the pressure drop through the filter element exceeds a predetermined degree.

3. A dust filter comprising a cylindrical filter element having its axis vertically disposed and formed of a flexible sheet material having interstices much smaller than its thickness, means for supplying dust laden gases to the upper interior portion of said element at a pressure greater than that on the outer surface thereof, a horizontally disposed tubular member pressed inwardly against the outer surface of said element to cause the latter to bend around said member under the pressure of the dust laden gases and thereby elongate the interstices of said element on the inner side thereof, said tubular member having a slot therein through its side contacting said element, means for applying relatively high pressure gas to said tubular member for discharge through said slot, means for moving said tubular member to and fro vertically whereby to traverse the outer side of said element, and means controlling said moving means and high pressure gas supplying means for interrupting the movement of said tubular member and the supplying of high pressure gas thereto whenever the pressure drop through the filter element falls below a predetermined degree, and resuming the movement of said tubular member and the supply of high pressure gas thereto whenever the pressure drop through the filter element exceeds a predetermined degree.

HENRY J. HERSEY, Jr.

REFERENCES CITED

The following references are of record in the file of this patent:

UNITED STATES PATENTS

| Number | Name | Date |
| --- | --- | --- |
| 996,860 | Kestner | July 4, 1911 |
| 1,321,490 | Sweetland | Nov. 11, 1919 |
| 1,493,789 | Mullen | May 13, 1924 |

FOREIGN PATENTS

| Number | Country | Date |
| --- | --- | --- |
| 114,262 | Australia | Nov. 19, 1940 |
| 709,109 | Germany | July 3, 1941 |
| 737,109 | Germany | July 7, 1943 |

Certificate of Correction

Patent No. 2,495,635 January 24, 1950

HENRY J. HERSEY, Jr.

It is hereby certified that error appears in the printed specification of the above numbered patent requiring correction as follows:

Column 2, line 52, for the word "sufficient" read *insufficient*;

and that the said Letters Patent should be read with this correction therein that the same may conform to the record of the case in the Patent Office.

Signed and sealed this 30th day of May, A. D. 1950.

[SEAL]

THOMAS F. MURPHY,
*Assistant Commissioner of Patents.*